(12) United States Patent
Tachibana

(10) Patent No.: US 6,591,488 B1
(45) Date of Patent: Jul. 15, 2003

(54) PRODUCTION SYSTEM

(75) Inventor: Katsuyoshi Tachibana, Tokyo (JP)

(73) Assignee: Hirata Corporation, Tokyo (JP)

( * ) Notice: Subject to any disclaimer, the term of this patent is extended or adjusted under 35 U.S.C. 154(b) by 23 days.

(21) Appl. No.: 09/669,554

(22) Filed: Sep. 26, 2000

(30) Foreign Application Priority Data

Apr. 7, 2000 (JP) ........................................ 2000-115409

(51) Int. Cl.⁷ ............................ B23P 21/00; B23P 19/00
(52) U.S. Cl. ............................. 29/783; 29/784; 29/786; 29/791; 29/793; 29/794; 29/822; 29/823; 29/771
(58) Field of Search .......................... 29/783, 784, 700, 29/564, 564.1, 430, 786, 791, 793, 794, 822, 823, 771

(56) References Cited

U.S. PATENT DOCUMENTS 4,531,284 A * 7/1985 Matsuura et al. ............. 29/784
5,111,750 A * 5/1992 Nozaki et al. ............ 104/172.4
6,226,848 B1 * 5/2001 Kurtz ......................... 29/407.1

* cited by examiner

Primary Examiner—John C. Hong
(74) Attorney, Agent, or Firm—Burns, Doane, Swecker & Mathis, LLP

(57) ABSTRACT

A production system includes a shuttle (2) for moving a work (W) on a predetermined track (1), a storeroom (3) for storing components of a plurality of types to be assembled to the work, and a plurality of assembly stations (4) arranged along the track between the track and the storeroom (3), each assembly station (4) including an assembler (41) for selecting and attaching one of tools of a plurality of types corresponding to the types of components and assembling the components to the work (W) using the applied tool, and a conveyor unit (42) arranged between the assembler (41) and the storeroom (3) to convey the components stored in the storeroom (3) to the assembler (41).

5 Claims, 8 Drawing Sheets

PRODUCTION SYSTEM

FIELD OF THE INVENTION

The present invention relates to a production system coping with a change in demand for products.

BACKGROUND OF THE INVENTION

Production lines for manufacturing various products have been automated by introducing industrial robots, thereby improving the production efficiency of products.

On the other hand, conventional production equipment used unique apparatuses for executing continuous processes, and therefore, the equipment scale can hardly be enlarged or reduced.

However, the quantities of products demanded by markets vary. Hence, an increase in production is sometimes required, while products are oversupplied due to changes in markets. In a such situation, the production equipment cannot be sufficiently exploited, and profits which justify the plant and equipment investment or running cost cannot be obtained.

SUMMARY OF THE INVENTION

It is a main object of the present invention to provide a production system capable of flexibly coping with a change in demanded production.

According to the present invention, there is provided a production system comprising:

moving unit for moving a work on a predetermined track;

storage unit, arranged along the track, for storing components of a plurality of types to be assembled to the work; and a plurality of assembly stations arranged along the track between the track and said storage unit, each of said assembly stations comprising assembly unit for selecting and attaching one of tools of a plurality of types corresponding to the types of components and assembling the components to the work on the track using the tool, and convey unit, arranged between said assembly unit and said storage unit, for conveying the components stored in said storage unit to said assembly unit.

In the present invention, the convey unit may convey the components sorted in units of types. In this case, the system may further comprise a tray on which the components are placed, and the convey unit may convey the components sorted in units of types using the tray. In this case, the storage unit may store the components sorted in units of types using the tray.

In the present invention, the convey unit may have a first end portion at the side of said storage unit side and a second end portion at the side of said assembly unit, the components are supplied from said storage unit at the first end portion, and the components are provided to said assembly unit at the second end portion.

In this case, the convey unit may circularly convey the components between the first end portion and the second end portion. In this case, the convey means may convey the components sorted in units of types and also sequentially circularly conveys them in accordance with the order of assembly to the work by the assembly unit. In this case, the convey unit may convey a tool corresponding to a type of components together with the components. In this case, the convey unit may comprise component convey unit for conveying the components and tool convey unit for conveying the tool. In this case, the system may further comprise a table on which the tools are placed, and driving unit for rotating the table to circularly move the tools placed on the table and move one of the tools to a position where the assembly unit receives the tool, the driving unit rotating the table to move, to the position, a tool corresponding to a type of components conveyed to the second end portion of the convey unit.

In the present invention, the moving unit may move the work in two directions of the track.

In the present invention, the assembly station may comprise means for receiving the work from the track into the assembly station. In this case, the system may further comprise change unit for changing a direction of the received work, and the assembly unit may assemble the components to the work whose direction has been changed.

In the present invention, the track may be a substantially linear track.

In the present invention, the assembly stations may be able to be added or removed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

Preferred embodiments of the present invention will now be described in detail in accordance with the accompanying drawings.

Figure 1:
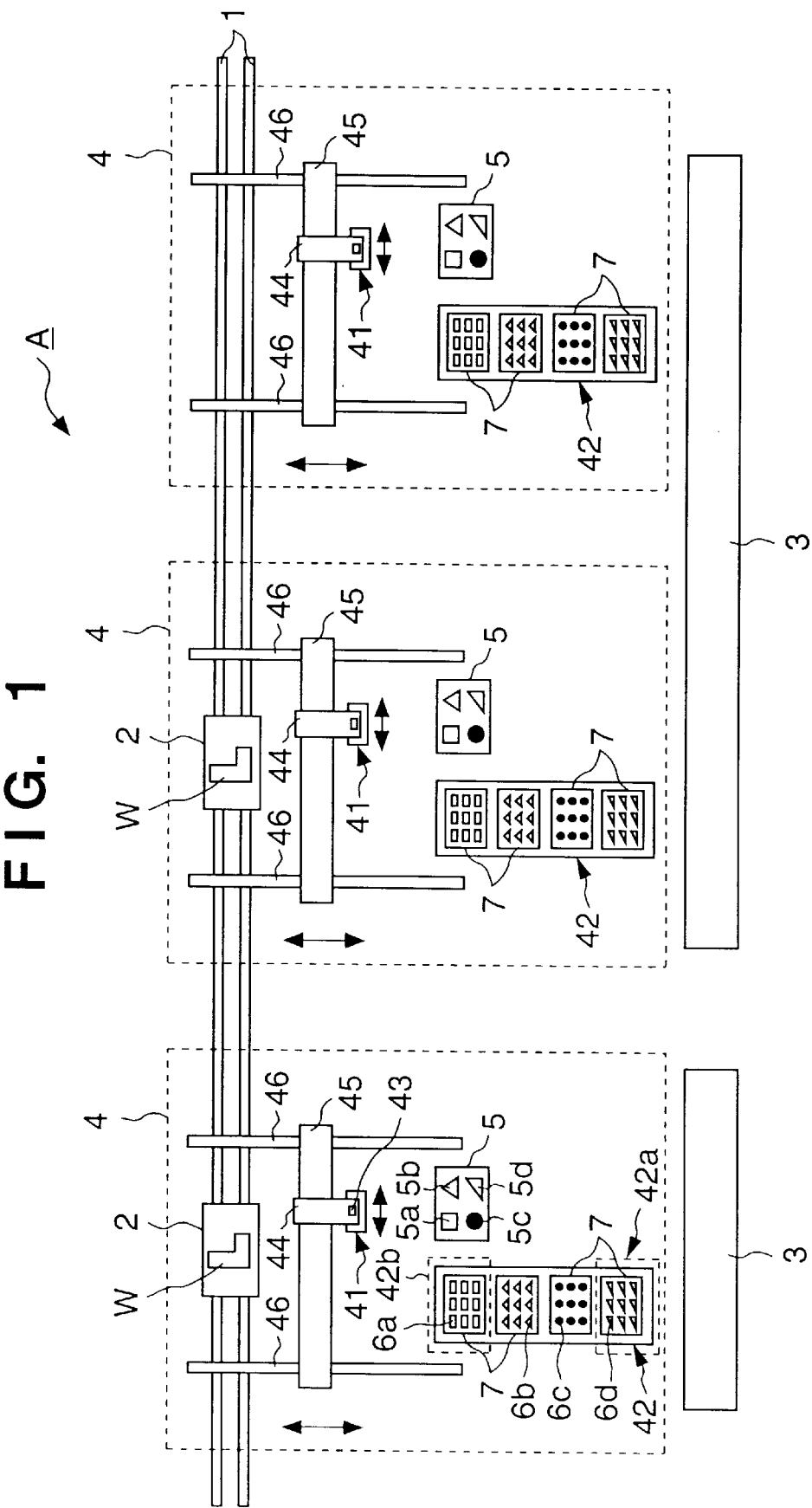
FIG. 1 is a plan view showing the schematic arrangement of a production system A according to an embodiment of the present invention.
Figure 6:
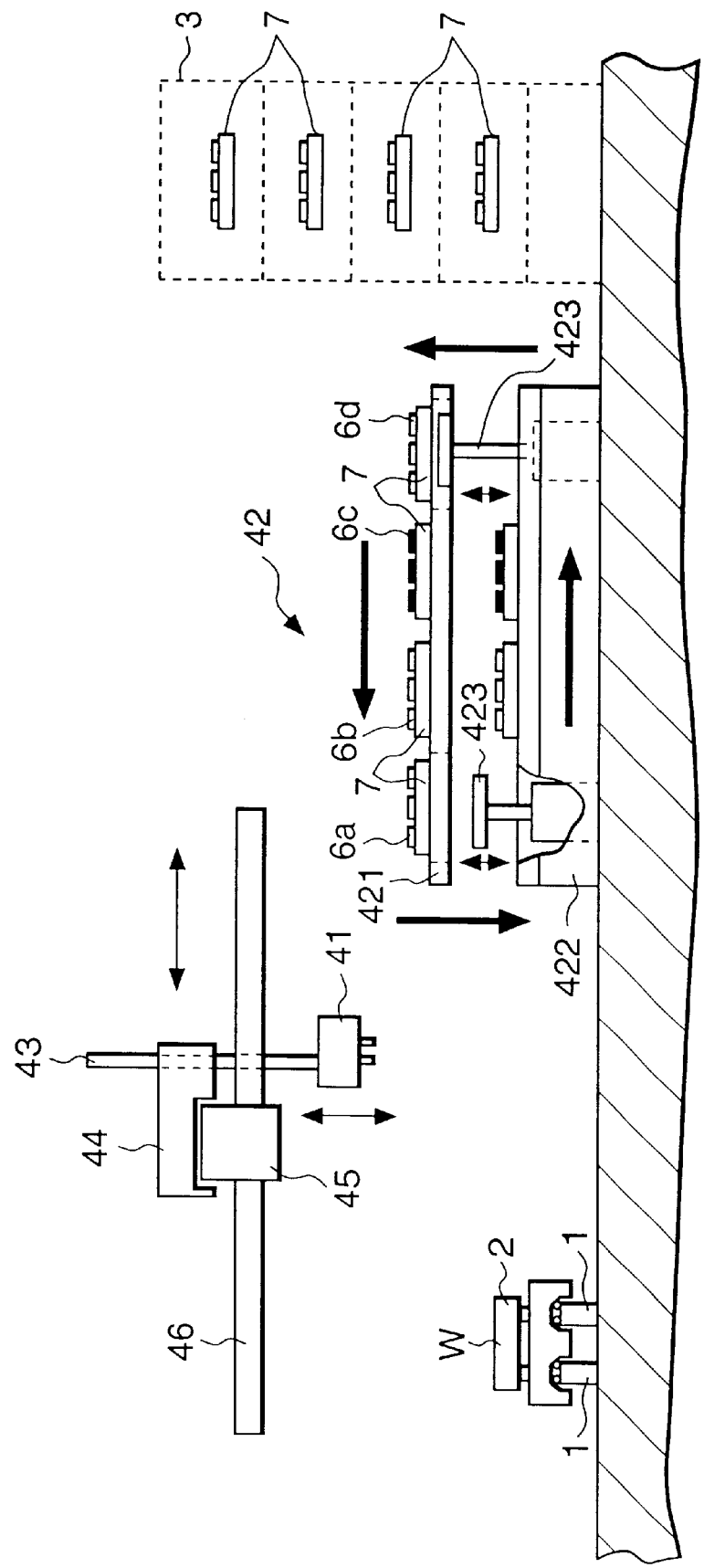
FIG. 6 is a (partially cutaway) side view showing the production system A shown in FIG. 1, which is viewed from the left side.

FIG. 1 is a plan view showing the schematic arrangement of a production system A according to an embodiment of the present invention. FIG. 6 is a (partially cutaway) side view showing the production system A shown in FIG. 1, which is viewed from the left side.

The production system A comprises shuttles 2 which have works W placed thereon and are self-propelled on a rail 1 to move the works W on a track along the rail 1, storerooms 3 arranged along the rail 1 to store components to be assembled to the work W, and a plurality of (three, in this case) assembly stations 4 arranged along the rail 1 almost between the rail 1 and the storerooms 3.

Each assembly station 4 has an assembler 41 for assembling components to the work W on the shuttle 2, and a conveyor unit 42 for conveying components stored in the storeroom 3 to the assembler 41. Each unit of the assembly station 4 can be freely added or removed and therefore can be extended or reduced in units of assembly stations 4 to cope with an increase/decrease in production required for the production system A.

The assembler 41 selects and attaches, to itself, one of a plurality of types of tools 5a to 5d placed on a tool table 5 in correspondence with the type of components to be handled, grips the component, and assembles it to the work W on the shuttle 2.

Referring to FIG. 6, the assembler 41 is attached to the lower end of a support bar 43 extending in the vertical direction. The support bar 43 extending through a slide unit 44 is biased by a driving mechanism (not shown) of the slide unit 44 and moves in the vertical direction. As a result, the assembler 41 can move in the vertical direction.

The slide unit 44 can be self-propelled in the horizontal direction along a guide rail 45. The guide rail 45 is supported by a pair of guide rails 46 arranged at left and right ends and can be self-propelled in the horizontal direction along the guide rails 46. The guide rails 46 extend from a portion near the end of the conveyor unit 42 to the rail 1. With this arrangement, the assembler 41 can three-dimensionally move and also move from the conveyor unit 42 or tool table 5 to the work W on the shuttle 2.

In consideration of the flexibility of equipment scale of the production system A and convenience in management or design, the assembly stations 4 preferably uniformly employ mechanisms of same types as the assemblers 41 and mechanisms for moving them, as shown in FIG. 1. However, mechanisms of different types can also cope with extension/reduction of equipment of the production system A as far as they can handle common tools and also move at least between the conveyor unit 42 or tool table 5 and the work W on the rail 1.

Figure 5:
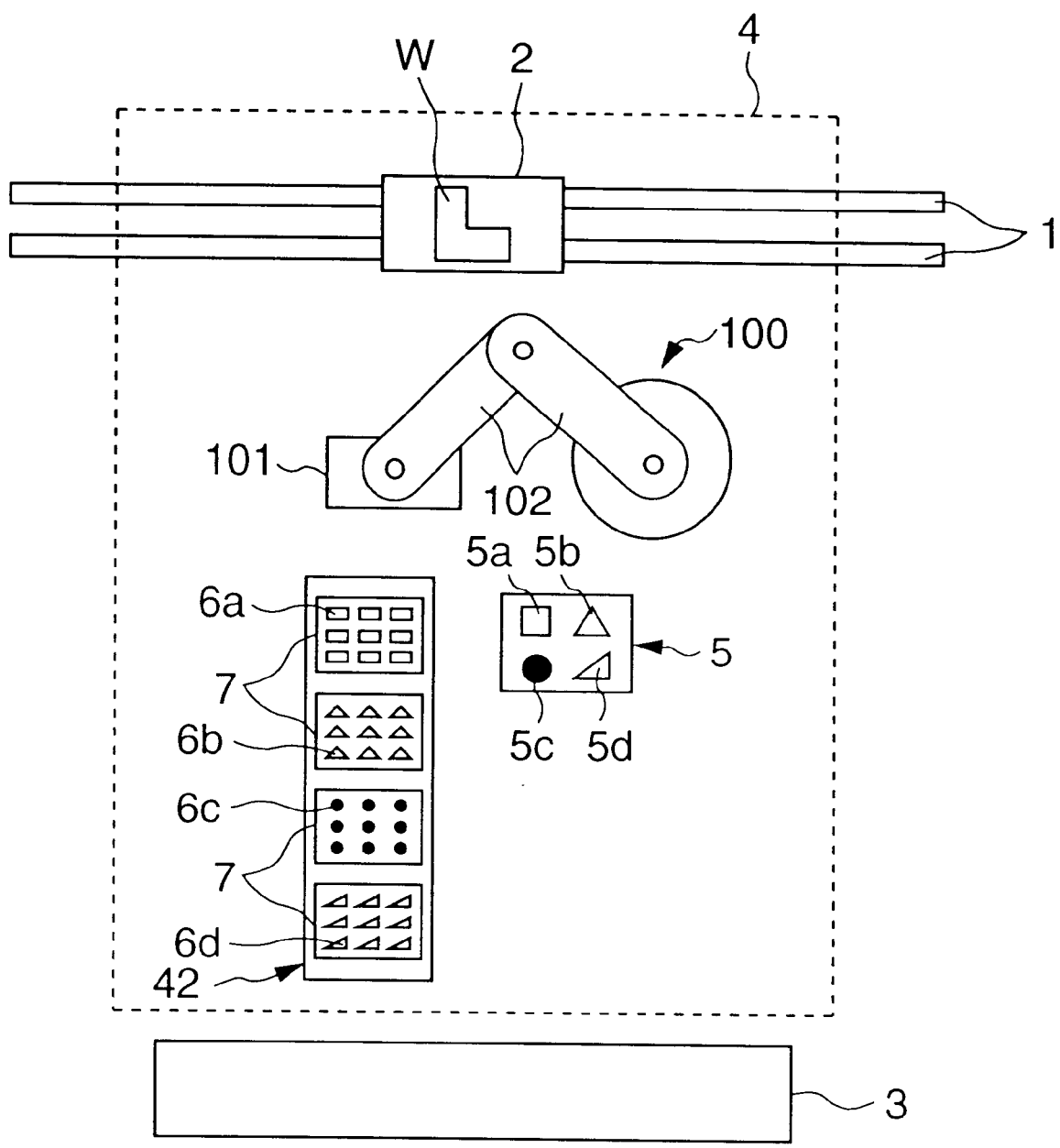
FIG. 5 is a view showing the assembly station 4 employing an articulated robot 100.

For example, in place of the assembler 41 and the mechanism for moving it, an articulated robot 100 shown in FIG. 5 can be employed by some assembly stations 4. The articulated robot 100 has a unit 101 corresponding to the tools 5a to 5d, like the assembler 41, at the distal end of an arm 102.

Each assembly station 4 may also use a plurality of assemblers 41 or assemblers of a plurality of types (e.g., an assembler for holding a component and an assembler for assembling a component). Alternatively, an assembler having a plurality of tools in advance may be employed.

The conveyor unit 42 conveys various components 6a to 6d to be assembled to the work W while keeping them sorted by trays 7 in units of types. In the example shown in FIG. 1, four trays 7 have components 6a to 6d, respectively, and each tray has nine components placed thereon. The conveyor unit 42 conveys these components in units of trays 7. When the components are conveyed in units of trays 7, handling of components is facilitated. The components 6a to 6d include not only the components of a finished article of work W but also mechanical elements such as screws, rivets, and packings.

In the assembly station 4 at the left end in FIG. 1, a first end portion region 42a on the storeroom 3 side and a second end portion region 42b on the assembler 41 side are set for the conveyor unit 42, as indicated by broken-lined rectangles. The components are picked up and supplied from the storeroom 3 onto the conveyor unit 42 in the first end portion region 42a. The components on the conveyor unit 42 are provided from the second end portion region 42b to the assembler 41. Hence, the assembler 41 is set to receive a component located in the second end portion region 42b. When the components are picked up and provided at separated positions in the conveyor unit 42, the components can be supplied without interrupting the operation of assembler 41.

As shown in FIG. 6, the conveyor unit 42 is constructed by two, upper and lower conveyors 421 and 422 to circularly convey the trays 7. More specifically, the conveyor 421 conveys the trays 7 from the storeroom 3 side to the assembler 41 side, while the conveyor 422 conveys the trays 7 from the assembler 41 side to the storeroom 3 side. The conveyor unit 42 has, at its two end portions, elevator units 423 which vertically move between the conveyors 421 and 422. The elevator unit 423 on the assembler 41 side transfers the tray 7 on the conveyor 421 at the end (second end portion region 42b) on the assembler 41 side to the conveyor 422. The elevator unit 423 on the storeroom 3 side transfers the tray 7 on the conveyor 422 at the end (first end portion region 42a) on the storeroom 3 side to the conveyor 421.

When the trays 7 are circularly conveyed, the components 6a to 6d to be assembled to the work W by the assembler 41 can be sequentially provided to the assembler 41. In this case, when the components 6a to 6d are arranged on the conveyor unit 42 in the order of assembly by the assembler 41, the operation efficiency can be improved.

The direction of circulation of components may be reverse to the direction indicated arrows in FIG. 6. The direction may be switched between two directions. In addition, the structure of the conveyor unit 42 for circulating the components is not limited to that shown in FIG. 6.

As shown in FIG. 6, the storeroom 3 has a rack shape for storing components using the trays 7. The operator takes a tray 7 containing components to the conveyor unit 42 by himself, thereby supplying the components to the conveyor unit 42. A mechanism for automatically conveying a tray 7 from the storeroom 3 to the conveyor unit 42 may be provided. Alternatively, a mechanism for conveying trays 7 between the assembly stations 4 may be provided in the storeroom 3. In this case, the storeroom 3 and each conveyor unit 42 form a so-called closed loop for conveying a tray 7 containing components, and the operation is automated. The storeroom 3 may also hold tools. Tools can also be held using trays 7, like components, and handled in the same manner as that for components, as described above. In place of the storeroom 3 which primarily statically stores components, a component conveyor unit such as a conveyor truck or air electric car may be employed as a component supply source.

The tool table 5 will be described next. The tools 5a to 5d required by the assembler 41 in correspondence with the components 6a to 6d to be assembled are placed on the tool table 5. Examples of such tools are a screw/nut locking tool (nut runner), caulking tool, and press fitting tool, also including tools for simply holding/conveying components.

When the type of component to be assembled changes, the assembler 41 appropriately moves to the tool table 5 to exchange the tool.

Since the combination of components and a corresponding tool is known in advance, a set of components and corresponding tool is preferably provided to the assembler 41.

Figure 2:
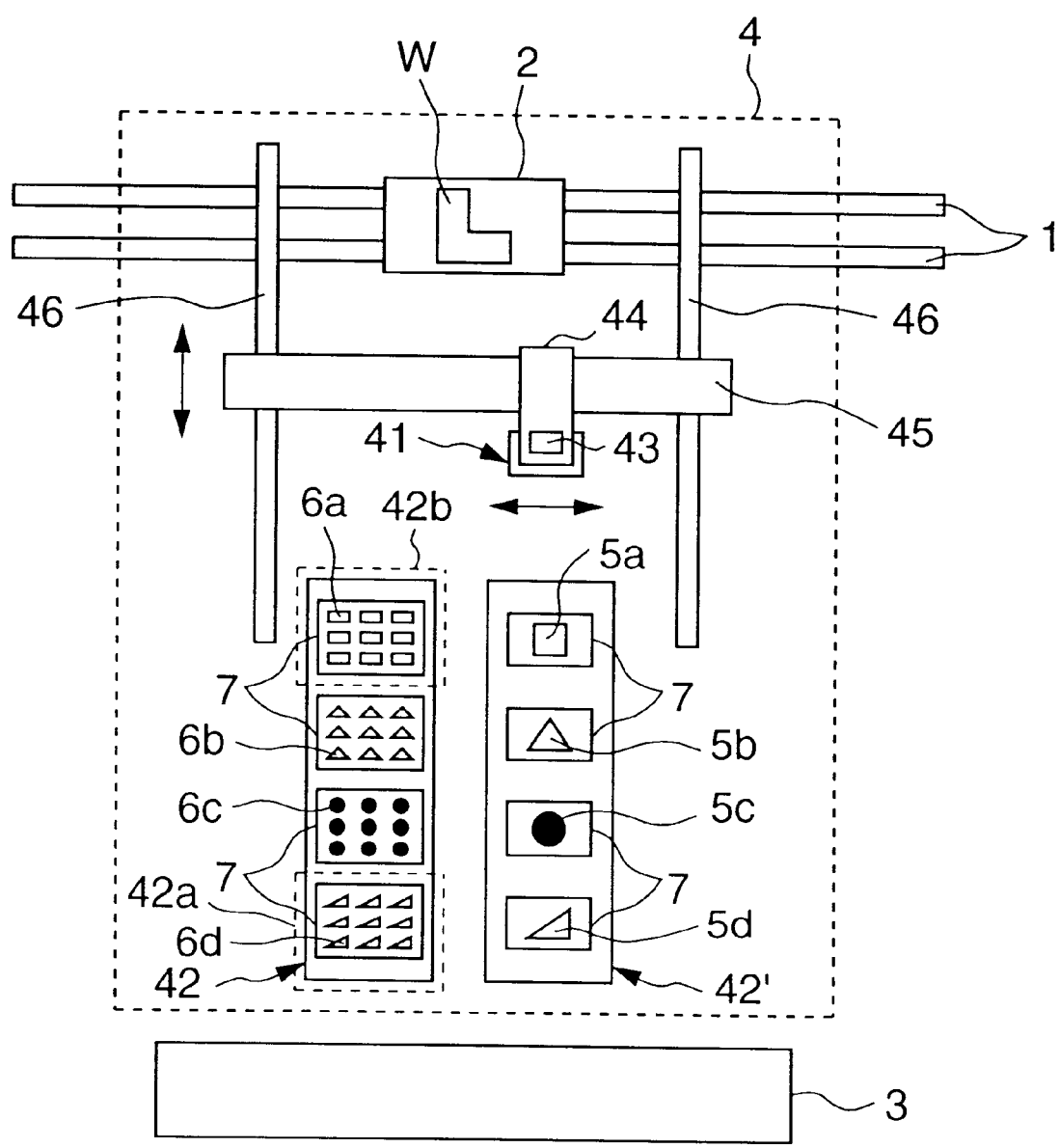
FIG. 2 is a plan view showing the schematic arrangement of an assembly station 4 employing a conveyor unit 42' for conveying tools 5a to 5d.

For example, as shown in FIG. 2, the tools 5a to 5d can be sequentially conveyed by a conveyor unit 42' similar to the above-described conveyor unit 42 using the trays 7 and provided to the assembler 41. In this example, the tools 5a to 5d are individually placed on the trays 7 and circularly conveyed by the conveyor unit 42'. The tools 5a to 5d are arranged on the conveyor unit 42' in accordance with the order of the components 6a to 6d conveyed by the conveyor unit 42. The conveyor units 42 and 42' synchronously convey the trays 7. Referring to FIG. 2, the tools 5a to 5d correspond to the components 6a to 6d, respectively. The assembler 41 is set to select and attach, of the tools 5a to 5d on the conveyor unit 42', a tool (tool 5a in FIG. 2) at a position corresponding to the second end portion region 42b of the conveyor unit 42.

In this case, the assembler 41 itself need not have a function of identifying the type of component and the type of corresponding tool.

In the example shown in FIG. 2, the conveyor unit for conveying the components and that for conveying the tools are separated. However, both the components and tools may be conveyed by one conveyor unit. In this case, components and a corresponding tool may be conveyed using one tray 7.

To obtain the same effect as described above, a turntable 8 shown in FIG. 3 may be employed in place of the conveyor unit 42'.

Figure 3:
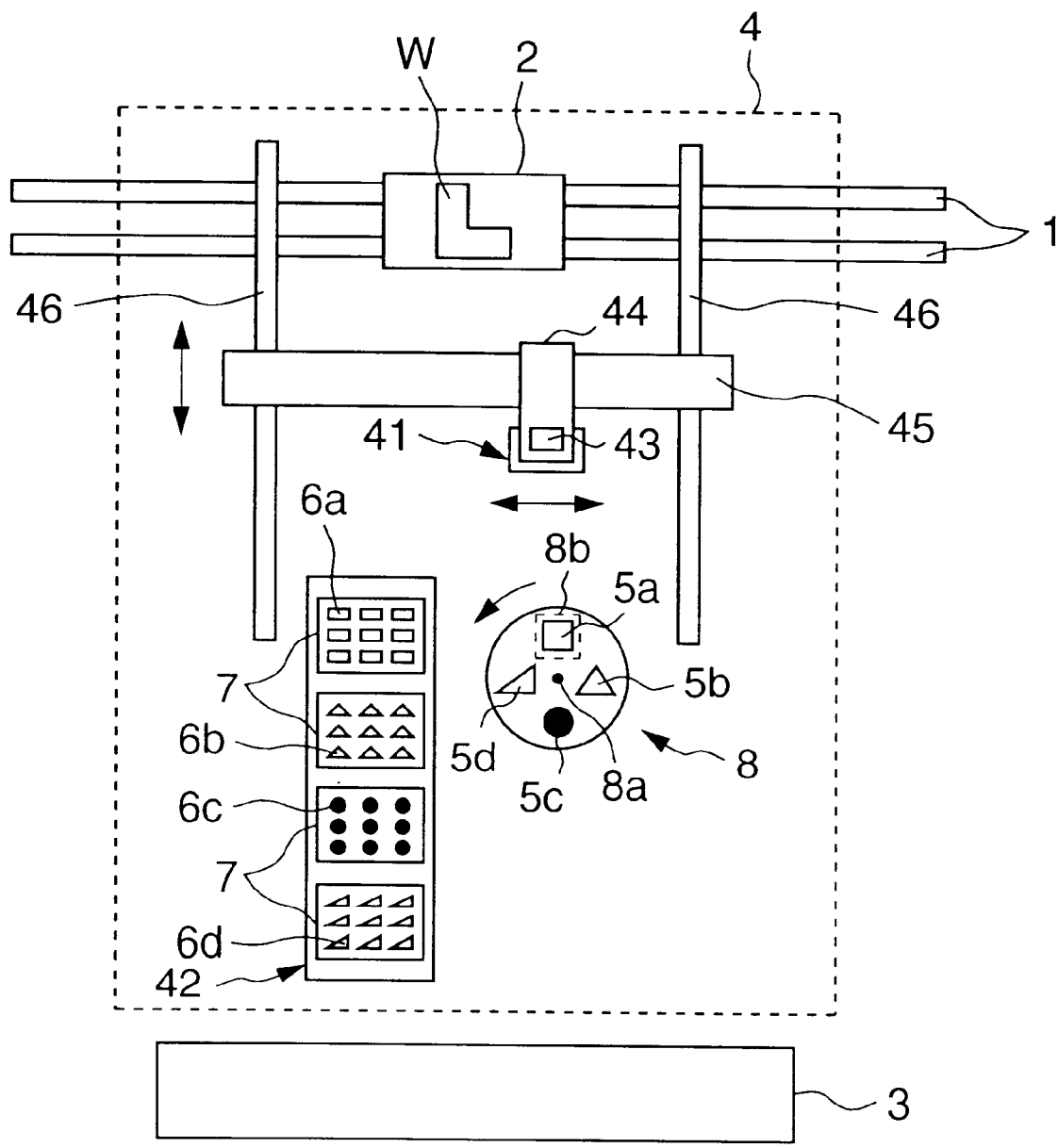
FIG. 3 is a plan view showing the schematic arrangement of the assembly station 4 employing a turntable 8 on which the tools 5a to 5d are placed.

The turntable 8 has a disk-like shape and can rotate about a shaft 8a while keeping the tools 5a to 5d placed thereon. The tools 5a to 5d circularly move as the turntable 8 rotates. Referring to FIG. 3, a tool in a region 8b indicated by a broken-lined rectangle is selected, received, and attached by the assembler 41. The turntable 8 can intermittently rotate counterclockwise in FIG. 3. The tools 5a to 5d are sequentially arranged clockwise. For this reason, when the turntable 8 rotates as the components 6a to 6d on the conveyor 42 are conveyed, the corresponding tools 5a to 5d can be provided to the assembler 41 in the conveyance order of the components 6a to 6d.

The shuttle 2 and rail 1 will be described next. This embodiment assumes that the shuttle 2 has a mechanism for self-propelling itself in two directions on the rail 1. However, the mechanism for moving the work W between the assembly stations 4 is not limited to the combination of the shuttle 2 and rail 1. Additionally, although two shuttles 2 are used in this embodiment, the present invention is not limited to this.

In this embodiment, the rail 1 is arranged on a straight line such that the work W moves on a linear track. However, the present invention is not limited to this. For example, the work W may move on a curved track. A linear track allows a relatively simple arrangement and is advantageous in extending/reducing the equipment scale of the production system A. The total length of the rail 1 can be increased/decreased in accordance with the number of assembly stations 4 or the like.

Figure 4:
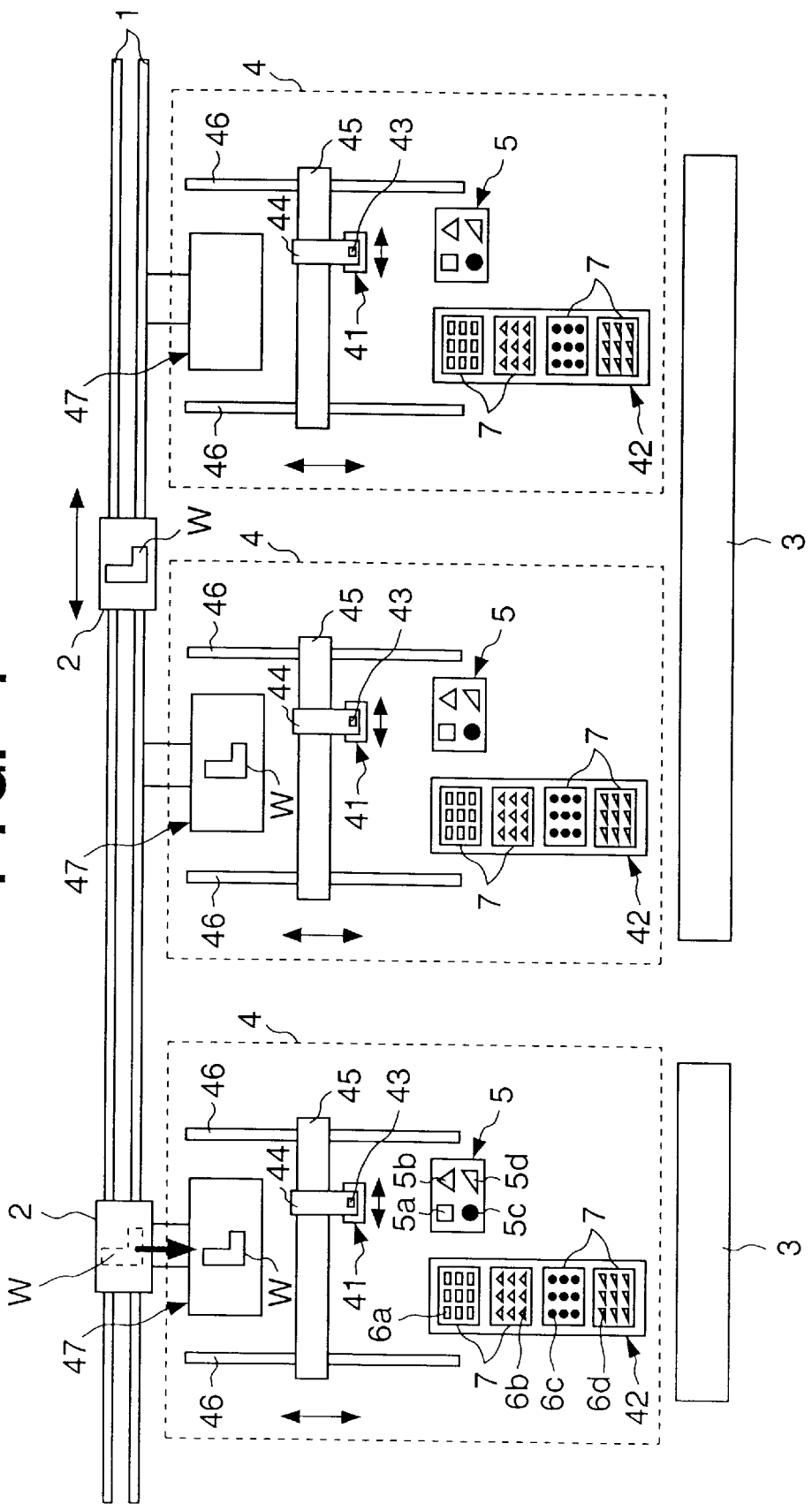
FIG. 4 is a plan view showing the production system A having a transfer machine 47 in each assembly station 4.

In this embodiment, the assembler 41 assembles a component to the work W which is present on the rail 1 through the shuttle 2. However, the work W may be temporarily received from the rail 1 into the assembly station 4 and then returned to the rail 1 after the assembly of a component. FIG. 4 is a plan view showing the arrangement of such a production system A. Each assembly station 4 has a transfer mechanism 47 for receiving the work W from the shuttle 2 and then returning the received work W to the shuttle 2.

When this transfer mechanism 47 is employed, the degree of freedom in movement of the shuttle 2 increases. More specifically, referring to FIG. 4, even when a component is being assembled to the work W in the central assembly station 4, the shuttle 2 can freely move between the assembly stations 4 on the left and right sides. Consequently, when the operation time changes depending on the assembly station 4, the work W can be optimally distributed and conveyed to each assembly station 4 by the shuttle 2. In addition, when the number of shuttles 2 is increased, the efficiency can be further increased.

The transfer mechanism 47 may have a mechanism for changing the direction of work W. In this case, to facilitate component assembly by the assembler 41, the direction of work W can be changed when it is received into the assembly station 4. Hence, the operation efficiency can be increased.

The function of the production system A shown in FIG. 1 will be described next. The units of the production system A are controlled by a computer system (not shown) on the basis of a predetermined control program, thereby implementing the functions to be described below.

First, the shuttle 2 conveys the work W and stops in front of a predetermined assembly station 4. The assembler 41 moves onto the tool table 5 around the time when the work W is conveyed, selects a tool, attaches the tool to itself, moves onto the conveyor unit 42, and picks up a predetermined component. After that, the assembler 41 moves onto the work W and assembles the component to the work W by the tool which holds the component. When a plurality of components are to be assembled, the assembler 41 repeats this operation. When assembly of components is ended, the work W is conveyed to another assembly station 4 by the shuttle 2 or conveyed externally from the production system A.

Extension/reduction of the equipment scale of the production system A will be described next.

A description will be made assuming that each assembly station 4 has the arrangement shown in FIG. 2.

The assembly station 4 shown in FIG. 2 assembles at least four components 6a to 6d to the work W. When an increase in production is required, the number of assembly stations 4 is increased, or another existing assembly station 4 is used to use a total of two assembly stations 4 for assembly of the components 6a to 6d, as shown in FIG. 7.

Figure 7:
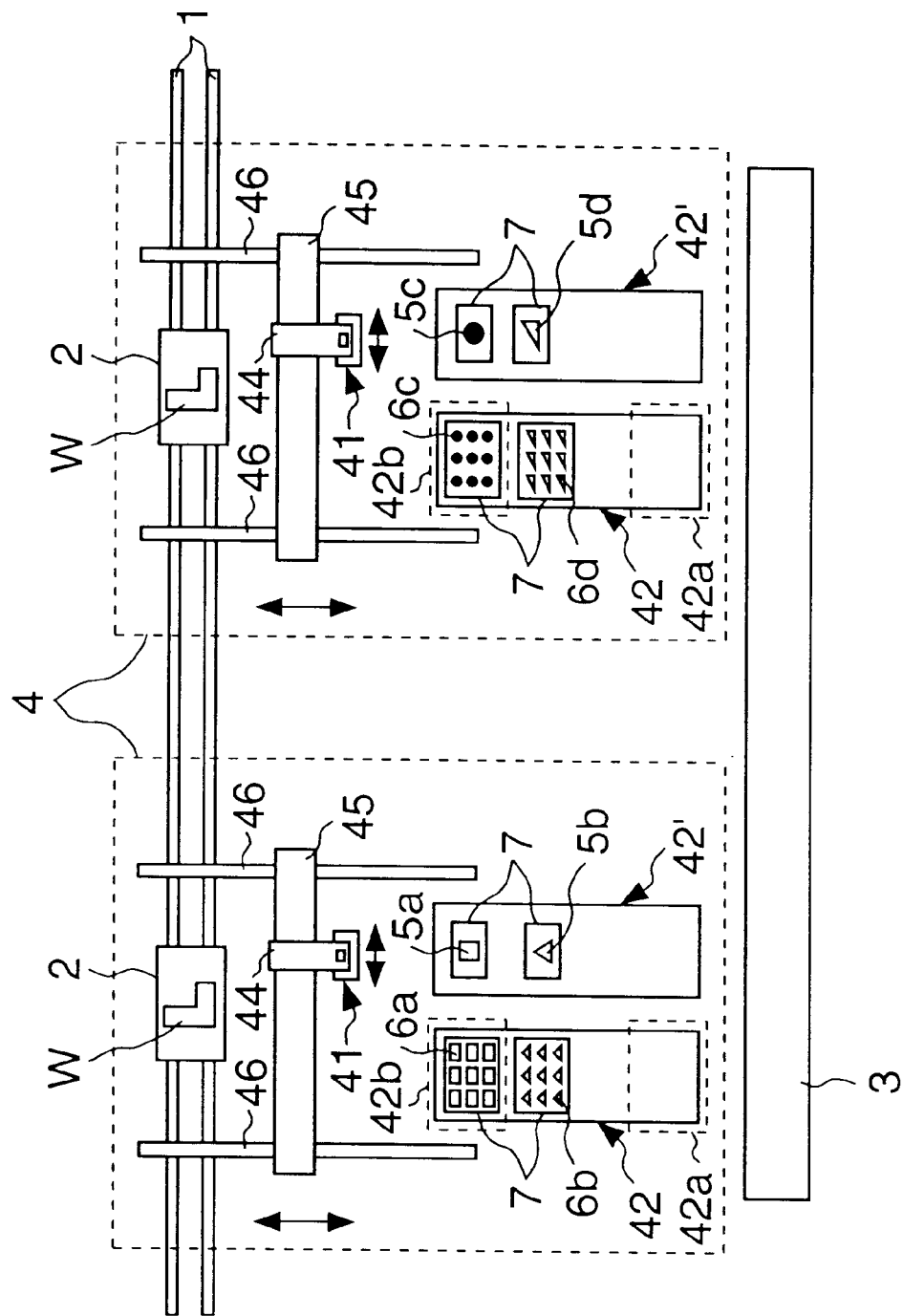
FIG. 7 is a plan view showing the production equipment of the production system A which is extended and modified from the arrangement shown in FIG. 2.

Referring to FIG. 7, one assembly station 4 assembles the components 6a and 6b. For this purpose, this assembly station 4 also has the corresponding tools 5a and 5b.

The other assembly station 4 assembles the components 6c and 6d. For this purpose, the assembly station 4 also has the corresponding tools 5c and 5d.

In this case, the production system A can be very easily extended and modified from the arrangement shown in FIG. 2 to that shown in FIG. 7 only by changing the positions of the components 6a and 6b or 6c and 6d using the trays 7, accordingly changing the positions of the tools 5a to 5d using the trays 7, and correcting the control program of the production system A. The positions of components can also be very conveniently changed using the trays 7.

To quickly correct the control program of the production system A, the following arrangement may be employed. The control computer of the production system A is constructed by a host computer for controlling the overall system, and subsidiary computers for controlling the stations. The control program and data (e.g., position information such as the assembly position and conveyance position) related to the procedure of processes necessary for the assembly operation by each station 4 are sorted in units of works, components, or tools to form modules. The host computer holds the modules. When the equipment scale of the production system A is determined and input to the host computer, the host computer determines allotment of components to be handled by each assembly station 4. On the basis of this allotment, correction can be done to add or delete a module to each subsidiary computer.

In extension/modification from the arrangement shown in FIG. 2 to that shown in FIG. 7, the components 6a to 6d are uniformly distributed. However, for example, one assembly station 4 may assemble only the components 6a, and the other assembly station 4 may assemble the components 6b to 6d. That is, the system can flexibly cope with the situation in accordance with the difference in assembly time between the components.

Referring to FIG. 7, only one tray 7 containing components of one of various types is arranged on the conveyor unit 42. However, a plurality of trays 7 each containing components of one type may be arranged.

Figure 8:
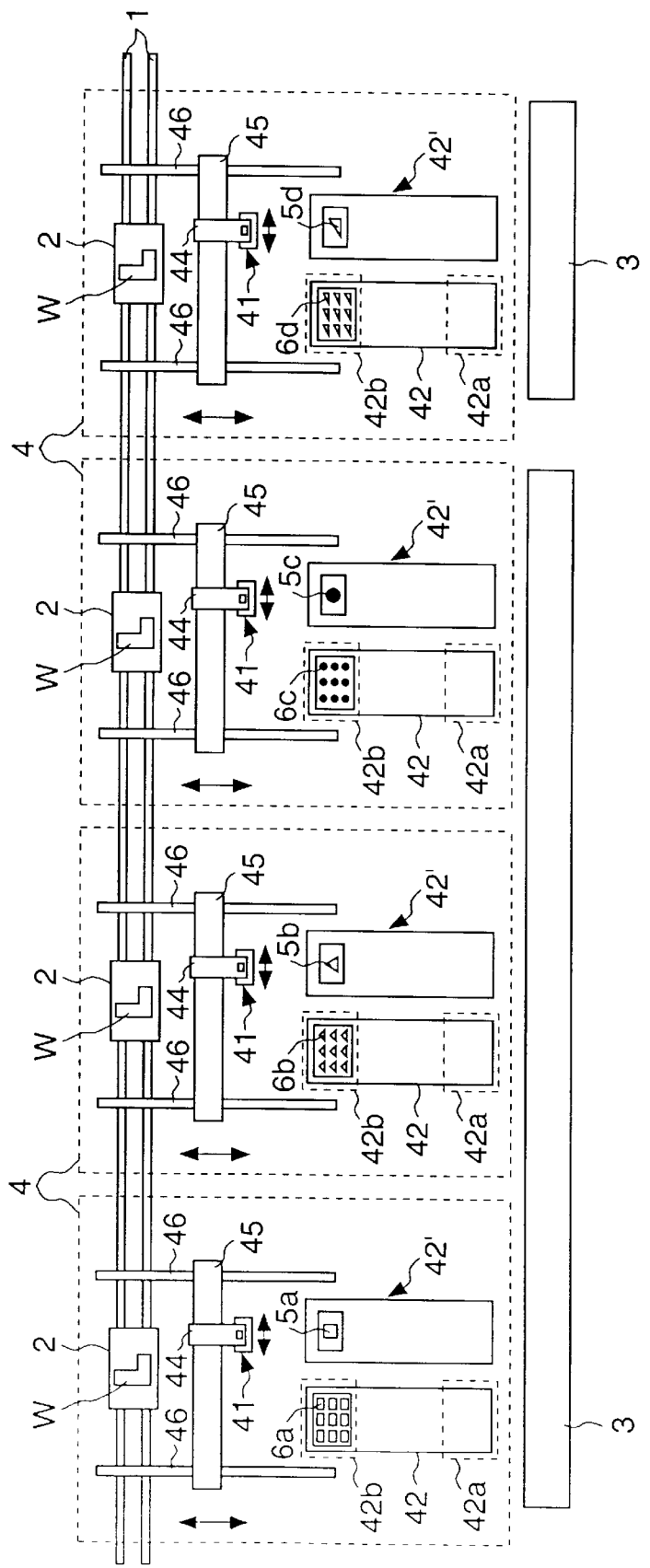
FIG. 8 is a plan view showing the production equipment of the production system A which is extended and modified from the arrangement shown in FIG. 7.

In the production system A shown in FIG. 7 as well, when the production need be further increased, the number of assembly stations 4 is increased, or another existing assembly station 4 is used to use a total of four assembly stations 4 for assembly of the components 6a to 6d, as shown in FIG. 8.

Referring to FIG. 8, each assembly station 4 assembles one of the components 6a to 6d. For this purpose, each assembly station 4 has only a corresponding one of the tools 5a to 5d.

As described above, the production system A can easily extend its production equipment. Conversely, to reduce the production equipment, it is modified from the arrangement shown in FIG. 8 to that shown in FIG. 7 or from the arrangement shown in FIG. 7 to that shown in FIG. 2. In this case as well, the system can easily cope with reduction because only the same procedure as in extension is required.

More specifically, the production system A can flexibly cope with extension or reduction of equipment scale mainly because the assembler 41 having versatility to tools of a plurality of types is employed. Especially, when a set of components and corresponding tool is provided to the assembler 41, the production system can further flexibly cope with extension or reduction of the equipment scale.

As has been described above, the production system according to the present invention can flexibly cope with a change in demanded production.

As many apparently widely different embodiments of the present invention can be made without departing from the spirit and scope thereof, it is to be understood that the invention is not limited to the specific embodiments thereof except as defined in the appended claims.

What is claimed is:

1. A production system comprising:
   moving unit for moving a work on a predetermined track;
   storage unit, arranged along the track, for storing components of a plurality of types to be assembled to the work; and
   a plurality of assembly stations arranged along the track between the track and said storage unit,
   each of said assembly stations comprising:
      assembly unit for selecting and attaching one of a plurality of tools, corresponding to the types of components, and assembling the components to the work using the tool,
      convey unit, arranged between said assembly unit and said storage unit for conveying the components stored in said storage unit to said assembly unit, and
      unit for receiving the work from said moving unit into said assembly station and for returning the work to said moving unit,
      wherein said moving unit is capable of moving the work in forward and reverse directions along the track between the plurality of assembly stations,
      wherein said convey unit has a first end portion at the side of said storage unit side and a second end portion at the side of said assembly unit, the components are supplied from said storage unit at the first end portion, and the components are provided to said assembly unit at the second end portion,
      wherein said convey unit circularly conveys the components between the first end portion and the second end portion, and
      wherein said convey unit conveys a tool corresponding to a type of components together with the components.

2. A production system comprising:
   moving unit for moving a work on a predetermined track;
   storage unit, arranged along the track, for storing components of a plurality of types to be assembled to the work; and
   a plurality of assembly stations arranged along the track between the track and said storage unit,
   each of said assembly stations comprising:
      assembly unit for selecting and attaching one of a plurality of tools, corresponding to the types of components, and assembling the components to the work using the tool,
      convey unit, arranged between said assembly unit and said storage unit, for conveying the components stored in said storage unit to said assembly unit, and
      unit for receiving the work from said moving unit into said assembly station and for returning the work to said moving unit,
      wherein said moving unit is capable of moving the work in forward and reverse directions along the track between the plurality of assembly stations,
      wherein said convey unit has a first end portion at the side of said storage unit side and a second end portion at the side of said assembly unit, the components are supplied from said storage unit at the first end portion, and the components are provided to said assembly unit at the second end portion, and
      wherein said system further comprises:
         a table on which the tools are placed, and a driving unit for rotating said table to circularly move the tools placed on said table and move one of the tools to a position where said assembly unit receives the tool, said driving unit rotating said table to move, to the position, a tool corresponding to a type of components conveyed to the second end portion of said convey unit.

3. A production system comprising:
   a moving unit for moving a work on a predetermined track;
   a storage unit, arranged along the track, for storing a plurality of tools; and a plurality of assembly stations arranged along the track between the track and said storage unit, each of said assembly stations comprising:
  an assembly unit for selecting and attaching one of the plurality of tools corresponding to the types of components, and assembling the components to the work using the tool, and
  a conveying unit; arranged between said assembly unit and said storage unit, for conveying the tools stored in said storage unit to said assembly unit.

4. The system according to claim 3, wherein each of said assembly stations further comprises a change unit for changing an orientation of the received work, and said assembly unit assembles the components to the work whose orientation has been changed.

5. The system according to claim 3, wherein said assembly stations can be added or removed.

* * * * *